United States Patent
Rutzer

[19]

[11] Patent Number: 6,126,157
[45] Date of Patent: *Oct. 3, 2000

[54] COMPACT VISE FOR FLY TYING

[76] Inventor: Max Rutzer, 1375 Barleen Dr., Walla Walla, Wash. 99362

[ * ] Notice: This patent issued on a continued prosecution application filed under 37 CFR 1.53(d), and is subject to the twenty year patent term provisions of 35 U.S.C. 154(a)(2).

[21] Appl. No.: 09/156,176

[22] Filed: Sep. 17, 1998

[51] Int. Cl.$^7$ .................................................. B23Q 1/25
[52] U.S. Cl. ......................... 269/71; 269/254 R; 269/239
[58] Field of Search ............................. 269/3, 6, 254 R, 269/71, 239, 97, 98

[56] References Cited

U.S. PATENT DOCUMENTS

| | | | |
|---|---|---|---|
| 1,387,821 | 8/1921 | Wilkinson | 269/98 |
| 4,039,178 | 8/1977 | Odames . | |
| 4,094,497 | 6/1978 | Stratton . | |
| 4,119,305 | 10/1978 | Anderson . | |
| 4,134,577 | 1/1979 | Price et al. . | |
| 4,214,739 | 7/1980 | Dailey . | |
| 4,216,949 | 8/1980 | Carter . | |
| 4,286,414 | 9/1981 | Ziegel | 269/254 R |

OTHER PUBLICATIONS

Kaufmann's Streamborn Flies, 1918 4th Ave Seattle, WA 98101–1107, Catalog, pp. 68–69 showing Dyna–King Fly Tying Vises, Renzetti Fly Tying Vises, Regal Fly Tying Vises, and Thompson Fly Tying Vises. Unknown Publication Date.

Catalog, pp. 57–58 Showing Fly Tying Vises: HMH Standard Fly Tying Vise, The HMH Spartan Vise Thompson Model "A" Vise, Renzetti Traveler Vise, Dyna–King Vise Extension, ReNzetti Present Vise, Dyna–King Aristocrat Vise, Dyna–King Professional Vise. Unknown Publication Date.

Angler's Workshop, Catalog p. 70, Fly Tying Tools & Accessories, Showing Regal Vises, Imported Vises, Griffin Vises. Published in 1995.

Fly Tying Magazine, Fall of 1997, pp. 47 and 61, Showing a Precision Rotating Vise (47) by Blue Mountain Angler and Tie Better Flies . . . Faster (61) Nor–Vise, by the Norlander Company.

Belazia Product Sheet for "The Ultimate Travel Vise & Related Accessories". Publication Date Unknown.

*Primary Examiner*—Timothy V. Eley
*Assistant Examiner*—Benjamin M. Halpern
*Attorney, Agent, or Firm*—Donald A. Bergquist

[57] ABSTRACT

A compact portable vise of the type designed to hold a fishing hook while a fly-like lure is formed, using methods known as "fly-tying," on the hook for use in the sport of fly fishing. The vise is particularly small to be shirt-pocket portable and alternatively may be supported by a clamp directly engaging a support or by a vise clamp that is mounted with screws on a railing, a gunwale, a board, or a tree, either fallen or erect. The vise head is connected to such support by an articulated arm that engages the support. The arm includes at least one pivot link that permits it to be bent about a first axis and a second pivot link connecting the vise head that permits the head to pivot on an axis perpendicular to said first axis and close to and parallel to the longitudinal axis of the head. These two pivot links permit easy and flexible manipulation of the vise head for viewing the work piece from a myriad of angles. The articulated arm bends to wrap around the clamp for compact storage.

4 Claims, 3 Drawing Sheets

COMPACT VISE FOR FLY TYING

BACKGROUND OF THE INVENTION

The present invention generally relates to clamps, and more particularly to those clamping devices used to hold fish hooks during the operation of tying flies thereon.

In fly fishing, the "fly", a bundle of colored threads, wings, bristles, or other materials that when assembled simulate a fly, is created by tying the materials to the fisherman's hook before the hook is attached to the line. Different fish and different fishing conditions demand the use of variant forms of "fly", so that there is a continuous need for the tying of "flies" on hooks, both before and during a fishing session.

Fly tying—conventionally the winding of a thread of silk or other strand material around the assembled bundle and the hook—is a fastidious operation and must be expertly and tightly performed, lest the "fly" be quickly and irretrievably lost. For this reason, use is often made of a so-called fly-tying vise, of which this invention presents improvements. In particular, this invention provides a fly-tying vise that may be folded to a compact form that will easily fit into a shirt pocket for storage and transport to provide for its ready availability at the fishing site.

DISCUSSION OF PRIOR ART

Numerous fly-tying vises have been developed over the years. Several have received U.S. patents, because of their novelty. A listing of many of these patents is provided in the accompanying information disclosure statement by applicant. It is common for such vises to be adapted to clamp on the edge of a table, bench, or other similar surface, with an elongated shaft of a reasonably long length to hold the vise head elevated above the surface at a convenient height for working around and beneath the vise head. It is common for either the vise head, the shaft, or the joint therebetween to have a pivot or pivots to allow movement of the workpiece gripped by the vise head to be moved around for viewing of and access to all sides and the top and bottom thereof.

SUMMARY OF THE INVENTION

This invention is an improvement over existing tools and methods for tying flies. The present invention includes a vise head with a restraint feature that, acting in cooperation with a pivot element, prevents undesirable lateral motion of the vise head elements, which lateral motion could damage elements that make up the vise head. The present invention further includes an elongated shaft that is separable from a clamp portion thereof and that is jointed to allow the shaft and the vise head to partially encircle the clamp portion, thereby to present the thus broken-down vise in a compact form for convenient storage in a shirt pocket or other similar space.

BRIEF DESCRIPTION OF THE DRAWINGS

This invention will be most easily understood by referring to the figures attached hereto, wherein.

DETAILED DESCRIPTION OF THE PREFERRED EMBODIMENT

The various figures attached hereto are useful in describing this invention. In these figures, the same part is identified throughout by the use of a unique reference number.

Figure 2:
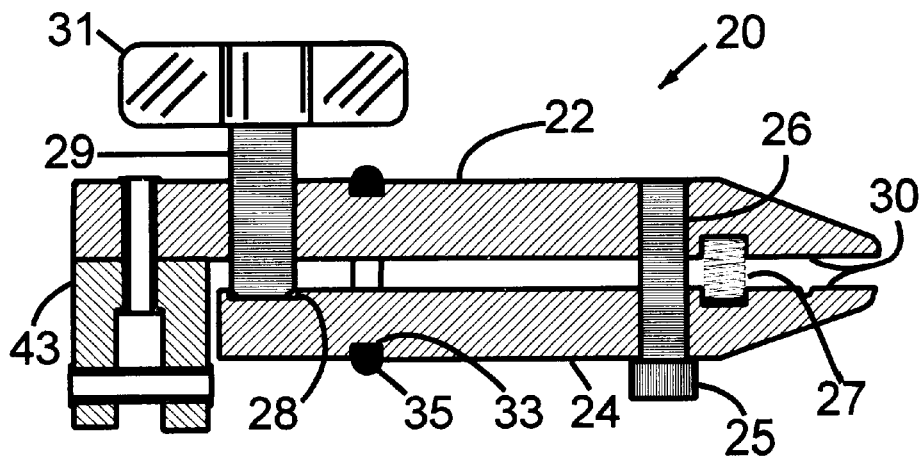
FIG. 2 shows a cross-sectional view of the vise head of this invention illustrating parts and details not otherwise visible.
Figure 3:
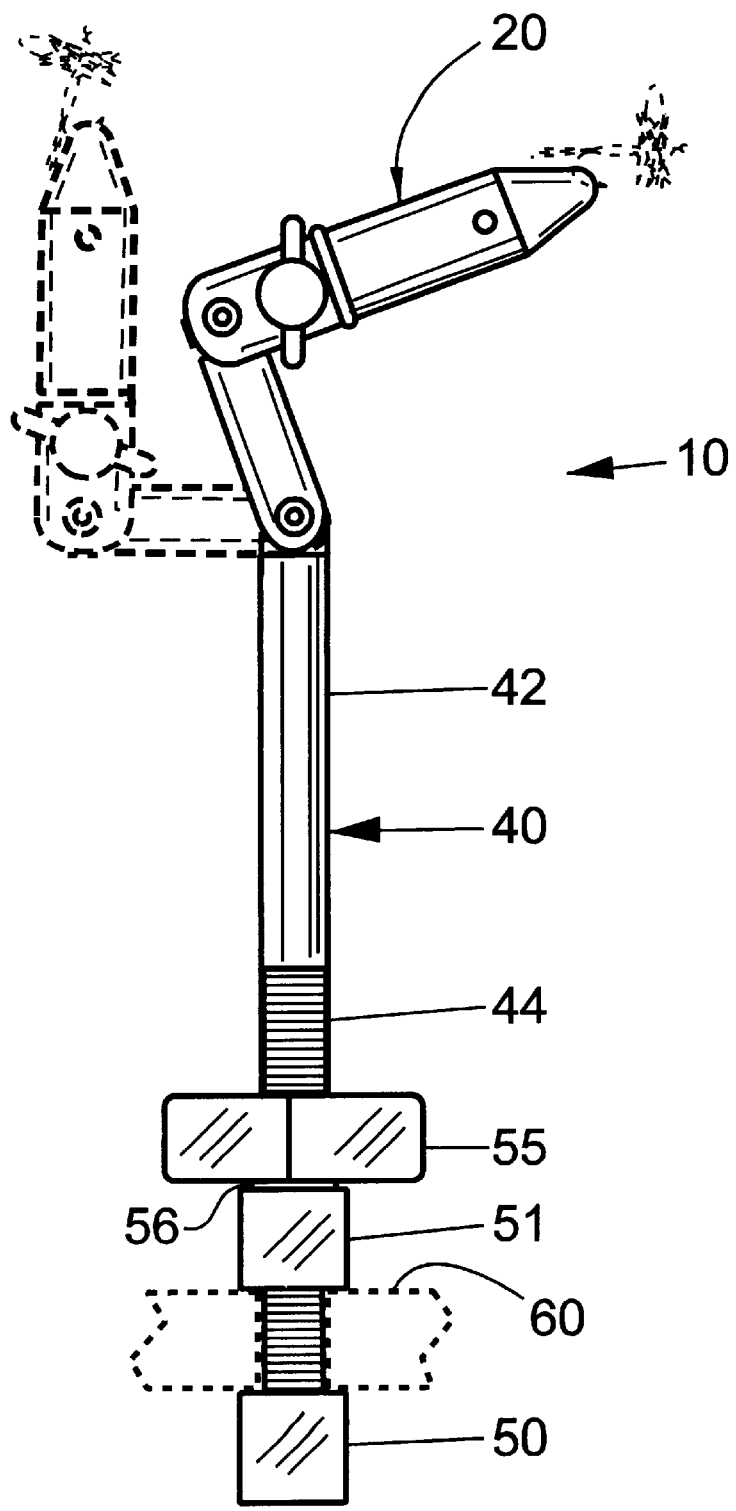
FIG. 3 shows a view of the fly-tying vise showing how the articulated shaft can present the workpiece in different positions.

Referring first to FIG. 3, we see the assembled fly-tying vise 10 of this invention. The vise comprises the vise head 20, the shaft 40 in two portions, the articulated portion 42 and the clamp portion 50. The vise head, shown in greater detail in FIG. 2, comprises two opposing cooperating jaws 22 and 24. One end of one of these jaws 22 is fixedly mounted to a pivotable end portion 43 of the shaft 40 while the adjacent end of the other jaw 24 is free. These shall be referred to as the proximal ends of the jaws; the other ends shall be referred to as the distal ends of the jaws.

The distal ends of the jaws are bluntly tapered in a substantially conical shape to a narrow gripping area, generally at 30, the mating flat surfaces thereof may each be scored, knurled, or grooved to improve their function of gripping.

The two jaws are held in close proximity by a gap-adjusting knob 25 that threadably engages a threaded stud 26 fixedly attached to and projecting from a first jaw 22 and passing through a hole in a second jaw 24 before engaging the knob 25. Turning the knob 25 alters the allowed distance between the first jaw 22 and the second jaw 24 at that particular point along the length of the jaws. It will be seen that this knob and stud create a pivot for the jaws, particularly for a rocking motion on the knob, but also for an undesired rotational motion centered on the stud.

In FIG. 2 can be seen a small compression spring 27 set in corresponding holes on the inside surface of each of the jaws 22 and 24 nearer to the distal ends than is the pivot point. This spring urges the clamping surfaces of the jaws apart and, by pivot action against the gap-adjusting knob, urges the faces of the proximal ends of the jaws toward one another.

Near the proximal end of the jaws, a clamping screw 29 threadably engages a first jaw 22, passing through it, and impinges upon the inner face of the second jaw 24. By turning the knob 31 fitted on screw 29, the space between the jaw faces at the proximal end is affected. Increasing this space causes the jaws to pivot on the gap-adjusting knob 25 and against the force of the compression spring 27 and forcing the clamping surfaces together on any workpiece present therebetween. The tip of the clamping screw 29 preferably engages a recess 28 in the face of the opposing jaw 24. Such engagement, a feature of other similar vise heads, prevents the undesired rotational pivoting of the jaws 22 24 about the stud 26 associated with the gap-adjusting knob 25; such motion could damage the compression spring 27 or cause it to become dislodged and lost from the assembly.

Now, it can be seen that the gap-adjusting knob 25 can be used as a rather coarse adjustment of the space between the clamping surfaces, thereby to easily and rapidly adjust the space to accommodate workpieces, usually fish hooks, of various sizes. By the extended lever arm on which it works, the clamping screw 29 then can be seen as a finer adjustment of the same gripping space and as a more forceful clamping means for the workpiece.

So far, the description of the vise head could be applied to that of many other inventors. Other inventors have not presented fly tying vise having a shaft 40 articulated in a manner that allows the vise head 20 and shaft 40 to fold to partially encircle a separable clamp portion 44 of the shaft and clamping apparatus attached thereto, to present the vise 10 in a compact form shown in FIG. 1 for storage and transport, even in a convenient shirt pocket. Each of the tightening devices—the clamping nut 46 of the clamping portion 44 of the shaft and the clamping knob 31 of the vise head—as well as the clamp feet 50 51, which are adapted to engage a table top 60, are made to be significantly flattened in one dimension so as to present a thickness of the collapsed vise no larger than the approximate diameter of the vise head 20. The result is a vise 10 that is adapted, when so collapsed, to easily fit into a pocket or into a protective slip case that may be kept in a shirt pocket or other flat, rectangular storage location.

Figure 1:
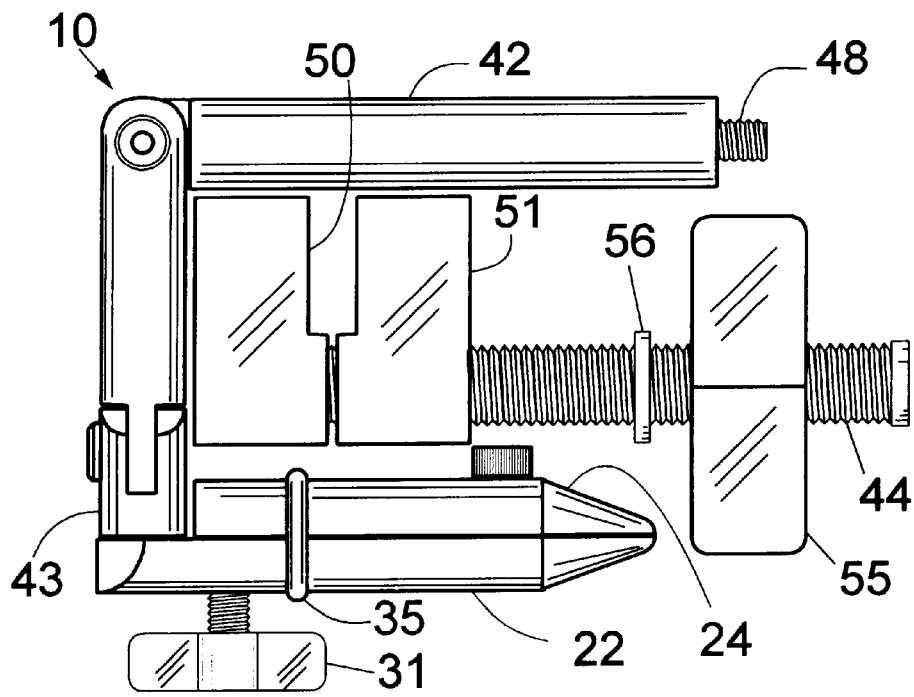
FIG. 1 shows the fly-tying vise disassembled and folded for compact storage.
Figure 4:
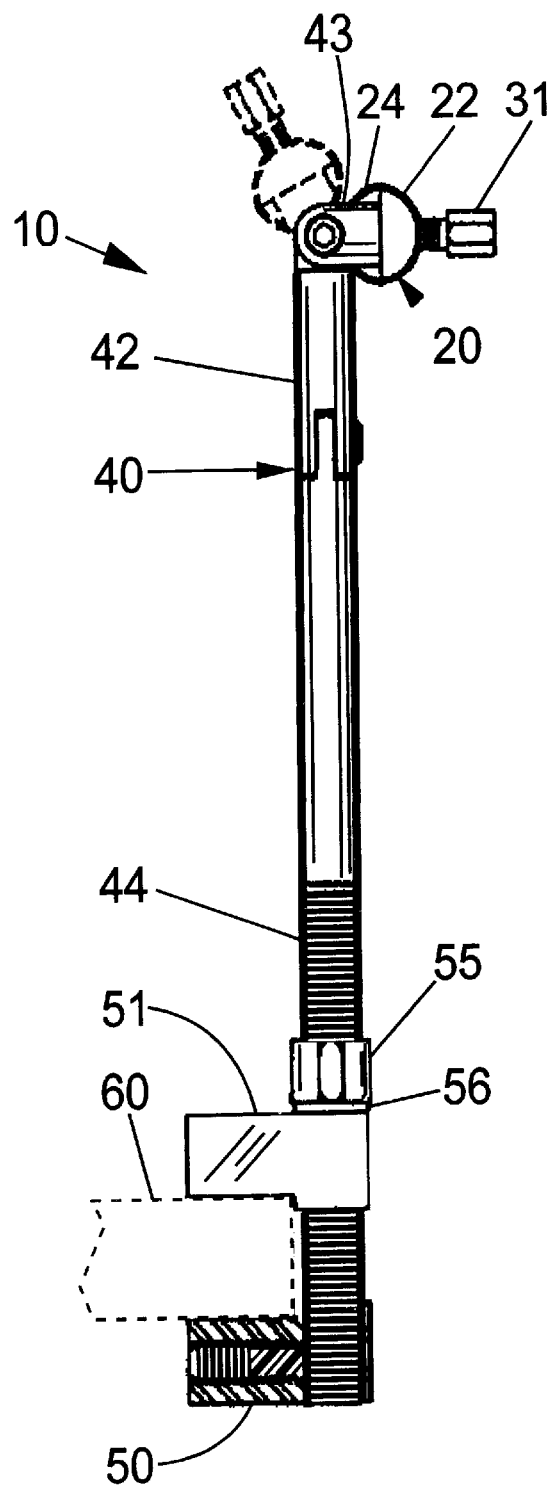
FIG. 4 shows a view of the fly-tying vise showing how the articulated vise head can rotate to present the workpiece in different positions.

Attention has been called to the shaft 40 in two portions, the articulated portion 42 and the clamp portion 44. To accommodate the compact configuration for storage as shown in FIG. 1, the shaft may be disassembled at a threaded connection. The threaded connection is seen in FIG. 1 as an axially-threaded stud 48 on the free end of the articulated portion 42, which engages an axially-threaded hole in the end of the clamp portion for assembly to a use position as shown in FIG. 3 and FIG. 4. In use, then, the clamping portion 44 is co-axial with the free end of the articulated portion 42, in the sense that the axes are aligned.

In use, the fixed foot 50 is placed against the bottom surface of a table edge or other fixed object and the floating foot 51 is placed against the top surface of the table edge or other fixed object. Clamping nut 55, which threadably engages the clamping portion 44 of the shaft 40, is tightened against the floating foot 51 to clamp the table top between the two feet. It is common practice to include a flat washer 56 between the clamping nut 55 and the floating foot 51. Other means for supporting the articulated portion 42 of the shaft 40 would be obvious to one skilled in the art and would be suitable for use in this invention.

A second feature of the present invention is the addition of a retaining ring of elastic material, such as an elastomeric "O"-ring of the type often used in compression in sealing applications in faucets and other fluid-handling apparatus. A circumferential groove 33 encircles the two jaw elements 22 24 of the vise head near the proximal end thereof. An elastomeric "O"-ring 35 of a suitable size surrounds the two jaw elements 22 24 and is retained in this groove 33. The action of this ring maintains lateral alignment of the two jaw elements 22 24 so that, should the clamping knob 31 be turned excessively to withdraw the associated threaded screw 29 from the recess 28 in the second jaw 24, the two jaws 22 24 will still be prevented from pivoting on the stud 26 associated with the gap-adjusting knob 25 by the forces applied by the "O"-ring 35. This feature amounts to extra protection to prevent damage to the compression spring 27. Although this extra protection is present, it is still preferred that the clamping screw 29 always be positioned to engage the recess 28.

It will be noted that the figures all show the vise head directed to the right, with the clamping knob toward the viewer. This orientation seems most comfortable to right-handed users. Because of the fixed connection between the vise head 20 and the pivotable end portion 44 of the shaft 40, the vise head 20 cannot be simply pivoted over the vertical to extend toward the left. A pivoting connection would allow this motion, although the vise head may then be less rigidly held.

Rather than providing such a pivoting connection, the vise can be adapted for convenient operation by a left-handed user by rotating the "fixed" clamp 50 foot 180 degrees around the threaded shaft clamp portion 44 and bringing the vise head to the fore by pivoting it about the topmost articulation of the shaft 40. Indeed, clamp foot 50 is not fixed, but is held in place by friction between the clamp foot and the shaft 44. The friction can easily be overcome in a rotational direction; not so in the longitudinal direction.

While various embodiments of fly tying vise have been disclosed, it should be understood that modifications and adaptations thereof will occur to persons skilled in the art. For instance, the vise of this invention is not limited in use to tying flies, but can be used for holding other small articles for inspection or other operations thereon. Other features and aspects of this invention will be appreciated by those skilled in the art upon reading and comprehending this disclosure. Such features, aspects, and expected variations and modifications are clearly within the scope of the invention where the invention is limited solely by the scope of the following claims.

I claim:

1. A vise comprising an elongated shaft to which is attached a vise head including:
   a. a first jaw having a finite length and a flat surface and with a proximal end attached to said elongated shaft and a distal end tapered to a blunt point;
   b. a second jaw having a finite length and a flat surface opposing that of said first jaw and being similarly tapered to a blunt point at one end corresponding to said distal end of said first jaw and referred to as the distal end of said second jaw, the distal end of said second jaw mating with the distal end of said first jaw, said opposing flat surfaces at said mating distal ends constituting cooperating clamping surfaces;
   c. a threaded stud fixedly attached to and projecting from one of said jaws and passing through a hole in a second said jaw and thereafter threadably engaging a gap-adjusting knob, thereby pivotably and adjustably connecting said first jaw and said second jaw, particularly for a rocking motion therebetween;
   d. a compression spring that urges apart said first and second jaws and is located in opposing recesses in the flat surfaces of said first and second jaws in the area thereof between said threaded stud and said clamping surfaces;
   e. a clamping screw positioned near said proximal end, and having an associated knob, said screw threadably engages one of said jaws and engages at its tip the opposing flat surface of a second of said jaws such that the space between said opposing flat surfaces is affected by turning said knob, said jaws thereby pivoting in a rocking motion about said gap-adjusting knob to effect pressure on an object between said clamping surfaces; and
   f. an elastic band encircling in tension, both jaws near said clamping screw to maintain, in cooperation with said stud, lateral alignment of said jaws;

and wherein said elongated shaft includes:
   a first articulation adjacent the attached said vise head that allows pivoting movement about a first axis parallel to the direction defined by said finite length of said first jaw;
   a second articulation spaced away from said first articulation along said shaft and allowing pivoting movement about a second axis that lies in a plane normal to said first axis; and
   means to removably attach an end thereof to a clamp portion comprising a threaded continuation of said shaft that is coaxial therewith, a rotatably-attached, axially-fixed clamp foot, a slidingly attached floating clamp foot, and a clamp nut engaged on said threaded continuation and capable of urging said floating clamp foot toward said fixed clamp foot, said clamp portion being thereby adapted to attach to a fixed object to support said vise.

2. A vise as described in claim 1 wherein said fixed clamp foot is so attached to said threaded continuation as to permit the rotation of said fixed clamp foot of at least 180 degrees around said threaded continuation.

3. A vise comprising an elongated shaft having a midpoint and distal and proximal ends to which is attached at a substantially right angle thereto at said proximal end thereof a vise head having two substantially parallel closely-spaced jaws of finite lengths for gripping a workpiece therebetween, said elongated shaft includes attaching means to removably attach said distal end thereof to a clamp means that is adapted to attach to a fixed object for supporting said vise, wherein the improvement is that said elongated shaft has an articulation near said midpoint thereof, said articulation dividing said shaft into a proximal portion that includes said proximal end and a distal portion that includes said distal end, said articulation allowing movement about an axis that is normal to a single plane in which lies said vise head and said shaft portions, thereby to allow said head and said shaft portions to at least partially wrap around a removed said clamp means to present the vise in a compact form for storage and transport.

4. A vise according to the teachings of claim 3, wherein said articulation allows movement of one said shaft portion relative to another said shaft portion only about an axis that is normal to said single plane at a point where said shaft portions are joined.

* * * * *